May 15, 1945.   S. JOHNSON   2,375,924
AIRCRAFT STRUCTURE
Filed Nov. 11, 1942   2 Sheets-Sheet 1
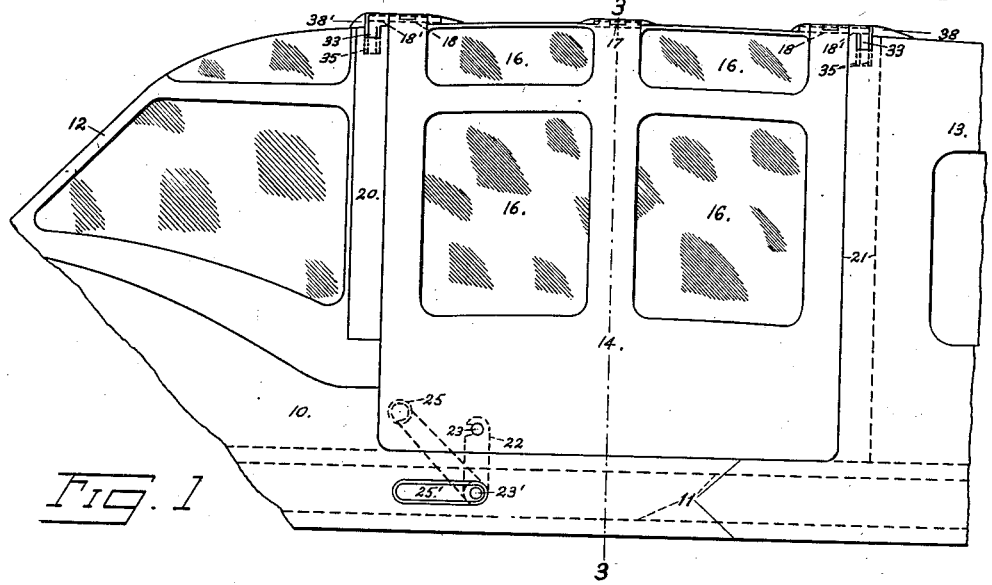
Fig. 1
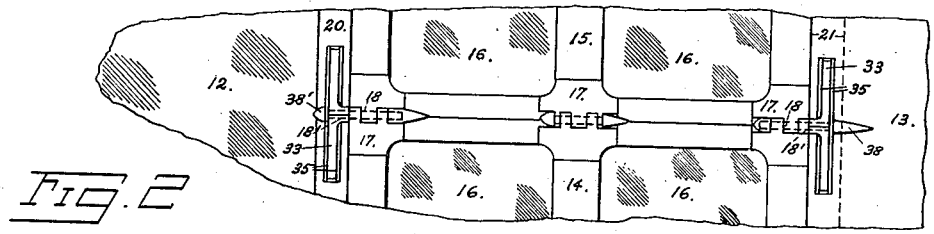
Fig. 2
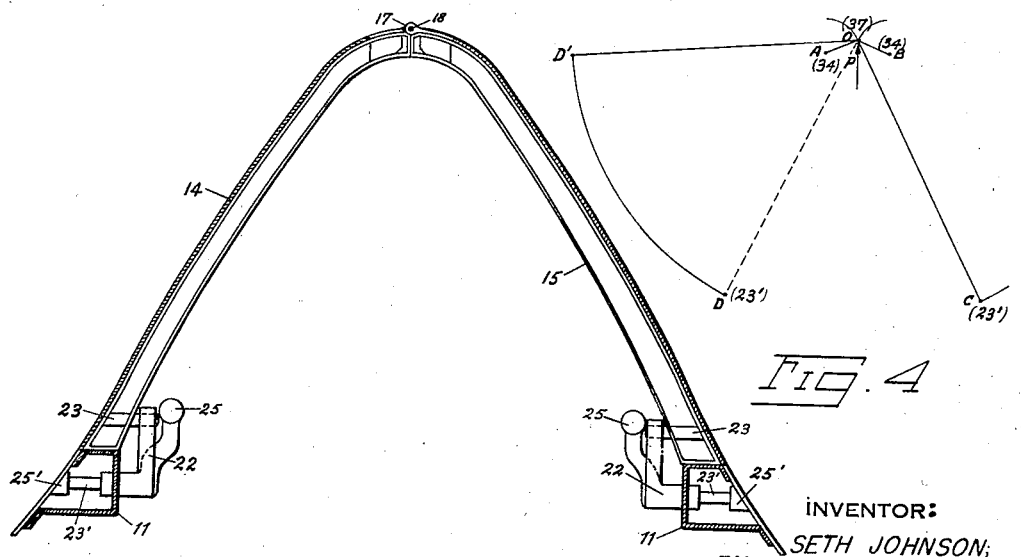
Fig. 4
Fig. 3
INVENTOR:
SETH JOHNSON;
BY 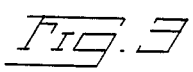
ATTORNEY.

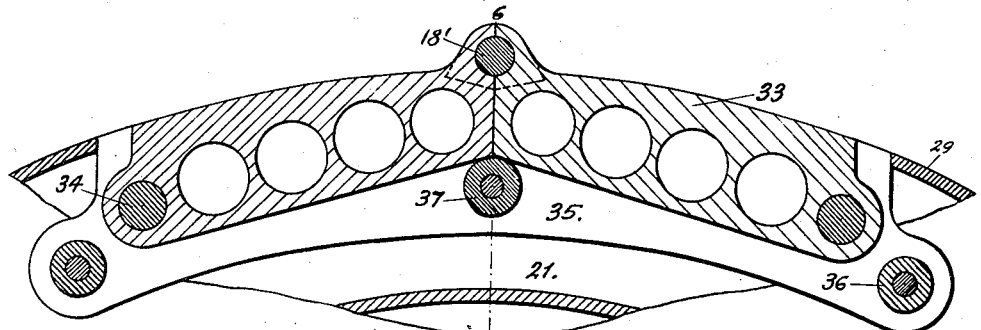
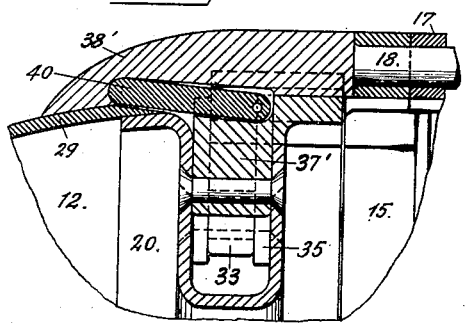
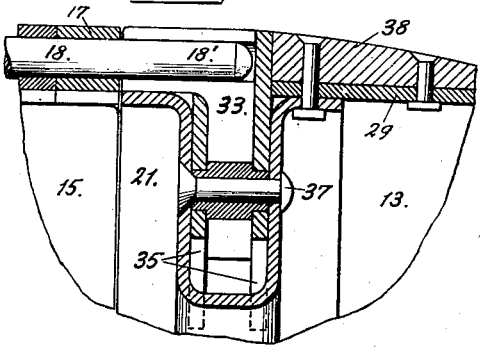
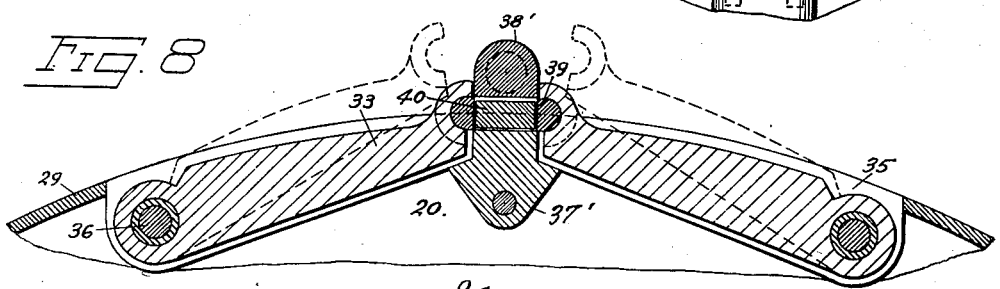
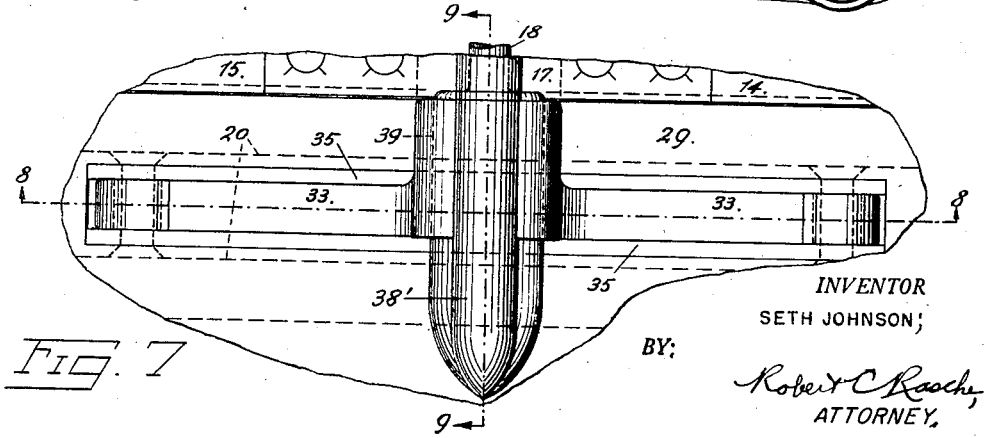

Patented May 15, 1945

2,375,924

UNITED STATES PATENT OFFICE 2,375,924

AIRCRAFT STRUCTURE

Seth Johnson, Farmingdale, N. Y., assignor to Republic Aviation Corporation, a corporation of Delaware Application November 11, 1942, Serial No. 465,251

5 Claims. (Cl. 244—121)

This invention relates to enclosures for cockpits of aircraft, more especially of single-place aircraft.

In aircraft of this type, the canopy usually comprises a transparent fixed windshield, a transparent slidable cockpit closure or hatch forming a rearward continuation of the windshield, and a fixed turtle-backed cover merging into the rear deck portion of the fuselage. Cockpit closures of the sliding type, require guiding-rails, etc., which project far back of the pilot's seat, thus increasing the length and weight of the canopy considerably and making it difficult to obtain a perfect streamline contour of the canopy. These sliding closures are also quite likely to be clogged and immobilized by ice in bad weather; it is quite difficult and expensive in practice to make them requisitely airtight; at high speeds and high altitudes, due to airstream friction and the high internal pressure, they become very hard to operate or to jettison in case of an emergency; and it is practically impossible by known means, to prevent them from vibrating or "fluttering," in their guiding rails.

These drawbacks become even more apparent and objectionable in the case of sub-stratosphere airplanes, in which it is desirable to have a so-called "pressurized," cabin, and also the problems of sealing the sliding connection between the closure and the turtle-back cover, and of maintaining the same ease of operation under both atmospheric and "pressurized" conditions, arise and become almost insuperable by any known means.

It has been proposed to solve these problems by means of lateral doors, hinged to the fixed windshield, but due to there being insufficient entrance space between the roof of the canopy and the upper longerons of the fuselage, in aircraft of the single-place type especially, it then becomes necessary to increase the height of the entrance door by extending it either downwardly through a cutout through the longerons, or upwardly by incorporating in the door a substantial portion of said arched roof. In the first case, quite a substantial break in structural continuity is entailed which seriously weakens the upper structure of the fuselage, and unless cumbersome, heavy and totally impracticable reinforcements are provided around the cutout, downward extension is unfeasible. In the second case, as the hinge of the door cannot be extended upwardly around the highly curved top of the windshield arch and around the correspondingly curved upper wing thus added to the door, it is necessary to reinforce—and thereby increase the weight—of the whole door frame, in order to give adequate strength to this cantilever door-wing, and then the problem of sealing the free, three-sided joint between this wing and the fixed part of the canopy roof under highly variable pressure conditions arises and is almost insuperable by any known means.

The present invention aims to overcome these difficulties by providing a non-sliding hatch between the fixed windshield and the turtle-back cover which will be eminently well adapted for employment with pressurized cabins, yet will not pass through the longerons or require hinge pins curving transversely around the roof or a heavy reinforced cantilever door.

A particular object of the invention is to provide a canopy-hatch of this improved nature which will nonetheless be quite simple and consist of but few parts—and thus be eminently well adapted for rapid production on a large scale—yet will be rugged, durable, foolproof, and quick to operate, withal.

The specific objects, as well as specific advantages and specific results, of the invention will be made manifest as the specific disclosure proceeds.

Several embodiments of the inventive concepts are particularized hereinafter in connection with the accompanying drawings, but it is to be understood that the embodiments this invention can take are limited only by the scope of the sub-joined claims. In these drawings, Figure 1 is a partial side elevation of the improved aircraft canopy of this invention;

Figure 2 is a corresponding top plan view;

Figure 3 is a section along line 3—3 of Figure 1;

Figure 4 is a force diagram;

Figure 5 is a transverse section of a swivel connection of the enclosure;

Figure 6 is a longitudinal section along line 6—6 of Figure 5;

Figure 7 is a partial, top, plan view showing a modification of the preferred embodiment;

Figure 8 is a transverse section along line 8—8 of Figure 7, and

Figure 9 is a longitudinal section along line 9—9 of Figure 7.

It is contemplated by the present invention that all the aforementioned difficulties and drawbacks be remedied by, among other things, employing a transparent cockpit enclosure, or hatch, comprising two symmetrical, independent, undivided, unitary doors, or hatched-halves capable of acting as struts hinged together along the peak of the canopy and normally attached by means of a releasable, swivel-connection to the apices of the arches of, respectively, the windshield and the turtle-back cover, in combination with a pair of latching mechanisms, manually operable from either the outside or the inside of the cockpit for normally fastening the longitudinal lower edges of said doors to the upper longerons of the fuselage, said swivel connection confining and restraining the upper part of said doors only, and only laterally and downwardly that the whole hatch is automatically and completely released and abandoned to the suction of the air stream, whereby both separate halves are automatically lifted off the airplane as a unit and removed automatically as a unit by the air stream to provide an emergency exit when, in an emergency, both latching mechanisms are simultaneously operated to unlatch both halves of the cockpit closure from said longerons.

It is also contemplated by the present invention that each door shall act independently from the other, and both shall serve as a strut between the swivel, the latch and the hinge connections so that the swinging movements of each of said doors about its hinge axis when opened for normal egress or ingress shall not affect the effectiveness of the swivel connection as long as the other door remains closed and latched to one of the longerons.

More specifically, in the preferred embodiment of the invention, the swivel connection comprises a pair of opposed journals formed by projections of the hinge pin and resting in split bearings, formed each in the normally adjoining free ends of a pair of toggle struts pivotally mounted in the arches of, respectively, the windshield and the turtle-back cover, so as to swing in opposite directions in a plane perpendicular to the hinge axis and thereby open the halves of said split bearings when said journals are urged to move upward, as when both sides of the hatch are unlatched and there is established an upward urge.

In "pressurized" cabins, this upward urge occurs, due to the pressure differential existing between the air outside and inside the cockpit, whenever both lower edges of the doors are unlatched in flight; or, in atmospheric-pressure cabins, when the pilot, after having unlatched both doors, pushes upwardly on the whole hatch, with the aid of the vacuum usually existing directly above the roof of the canopy.

In a modification of the preferred embodiment, an auxiliary thrust strut is incorporated in each swivel connection so as to transmit the tensile loads to the fixed frame of the canopy.

Referring now more particularly to the drawings, there is shown a portion of an aircraft fuselage generally designated by the numeral 10 and numeral 11 indicates the upper longerons of said fuselage. A fixed canopy, including a front transparent windshield 12 and a rear turtle-back cover 13, forms a streamlined upward projection of said fuselage above said longerons.

Access to the cockpit is provided by an openable and removable cockpit closure, or hatch, fitting into the opening between the windshield and the turtle-back cover. This closure is comprised of a left-hand door or panel, having a frame 14 and a right-hand door or panel, having a corresponding or symmetrical frame 15, both doors being provided with transparent panels 16. These frames 14 and 15 are hinged together along their upper edges by means of three horizontal hinges 17. The pins 18 of the two extreme hinges have extensions 18' projecting in opposite directions within the windshield and within the turtle-back cover, respectively. These projections 18' act as journals, co-operating with toggle-struts 33 acting as split bearings and pivoted at 34 in transversal cutouts provided in the apices of the arches 20, 21 of the windshield and of the turtle-back cover, respectively, thereby establishing a swivel connection between each end of the upper edge of the frames 14, 15 and the fixed part of the canopy.

At their lower edges, these frames 14, 15 carry a locking pin 23, cooperating with a latching hook 22 pivoted to the longerons 11. Each hook 22 is operated by either an inner handle 25 or an outer handle 25', normally collapsed in a cut-out of the fuselage.

As shown in Figures 5 and 6, in detail, each swivel connection comprises a pair of opposed swivel pins or journals 18' formed by the projections of the pins 18 of the two extreme hinges 17. These journals rest in the split bearings formed in the normally adjoining free ends of the two pairs of toggle-struts 33, pivoted at 34 to the frames or arches 20, 21 and working between two pairs of side guides 35, fastened at 36 to said frames or arches 20, 21. In their closed or normal position (shown in Figure 5), these toggle-struts 33 rest upon supports 37 acting also as central fastening means to secure the plates or guides 35 to the arches 20, 21, but the struts 33 are free to swing upwardly in opposite directions in a plane perpendicular to the hinge axis and thereby open the halves of said split bearings, when the cockpit closure 14, 15 carrying the journals 18' is lifted, either automatically by air pressure, or by hand, after having been unlatched from the longerons 11.

Thus, as shown by means of the force-diagram of Figure 4, since points A(34), B(34), C(23¹) and D(23¹) are always stationary and fixed relatively to the fuselage structure, the toggle AOB will remain closed, even when a force, P, is applied to it, even at O, and as long as only one of the members OC or OD—each acting then as a strut under tension—is in action and applying its compressive force, which will act effectively upon both of the struts, OA and OB, to keep them closed and abutting. That is to say, point O is then held in equilibrium by the reaction of compression in members OA and OB and by the downward component of the tension reaction in member OC; in member OD; or in both members. It is to be understood that points C and D are to always lie within the angle AOB, which is always less than 180° but always greater than 90°.

Hence, the hatch cannot be accidentally knocked open by the pilot's movements or opened by vibration, air blast or the like, and will remain closed and locked as long as but one of the separate side-panels is latched to the fuselage. However, upon release of one latch, that side of the hatch can be raised and upon release of both latches, simultaneously or successively, the toggles 33—33 come apart, the hinge pin is freed and the doors readily come out of engagement, as a unit, united by the hinge pin 18, and can easily be jettisoned as a unit by the pilot in order to "bail out" of the cockpit. That is to say, release of the points C and D, removes the restraining force holding the toggle-halves together in abutment and permits point 18' to move, or be moved, upwardly, and the securing of either point C or point D restrains the toggles and permits opening upwardly of the unsecured side or panel of the hatch about the hinge pins 18.

A rear extension 38 is provided and forms a rearward streamline transition between the peak of the rear hinge and swivel connection which projects above the contour of the canopy and the turtle-back cover 13, while a front extension 38' provides a similar streamline transition between the front hinge and swivel connection and the windshield 12.

Figures 7, 8 and 9 show a modification of this preferred embodiment of the invention, in which the journals 18' are replaced by semi-cylindrical opposed side projections 39 of the fairings 38, 38', which, instead of being fastened on the peaks of the windshield and of the turtle-back cover, form, in this modification, two opposed solid continuations of the pins 18 of the two extreme hinges 17.

Two longitudinal openings, slightly slanting in opposite directions, are provided, half in said fairing 38, 38' and half on top of the supports 37', for receiving a pair of thrust struts 40. These struts 40 are adapted to transmit the tensile loads to the fixed frames or arches 20, 21, and thus relieve the working parts of these loads.

In cases where it may be found desirable, the two illustrated latch-groups 22, 23, etc., may be replaced by the canopy-locking mechanism disclosed in U. S. Patent No. 1,896,203 to C. Rosatelli, without departing from the scope of the inventive concepts or that of the sub-joined claims.

It is to be understood that various other changes and modifications may be made in these structures without departing from the spirit or scope of the inventive concepts.

Having thus disclosed the invention and several embodiments thereof, what is claimed is:

1. In an airplane, having a canopy including a fixed member and having cockpit doors hinged together along the longitudinal peak of the canopy; a swivel connection between said doors and the said fixed member; each of said swivel connections comprising a split bearing; toggle struts pivoted at one end to the fixed member for movement in planes perpendicular to the hinge axis, each of said split bearings being located in the free end of the pair of said toggle struts; and a swivel journal carried by said doors and normally mounted in said split bearings.

2. In a hatch for an airplane canopy having a fixed member, a swivel-connection therefor comprising toggle struts pivoted to said fixed member, split bearings located in the free ends of said toggle struts, a journal carried by said hatch and normally mounted in the bearings, said journal having openings provided therein; and a pair of struts mounted in said openings and abutting at one end against said journals and at the other end against said fixed member, whereby to transmit all tensile loads directly to said fixed member.

3. The combination with an aircraft fuselage having a cockpit, of a sectional hatch comprising a pair of doors above said cockpit, the adjoining edges of said doors being hinged one to the other, a journal in alignment with the hinge and projecting from each end of the hatch, struts having complementary half bearings at their inner ends and hinged at their outer ends to the fuselage at each end of the hatch to move to and from positions where their inner ends abut and align said complementary half bearings to embrace the adjoining journal, and a releasable lock between the free edge of each door and the fuselage, the release of both locks permitting the struts to be moved out of alignment.

4. The combination with an aircraft fuselage having a cockpit, of a sectional hatch comprising a pair of doors above said cockpit, the adjoining edges of said doors being hinged one to the other, a journal projecting from each end of said hatch adjacent the hinged edges of said doors, a lock operable between the free edge of each door and the adjoining portion of the fuselage at the side of the cockpit, and an attaching means mounted on the fuselage at each end of the hatch for cooperation with the adjacent projecting journal, each attaching means comprising a pair of struts hinged at their outer ends to the fuselage and carrying complementary half bearings at their inner adjoining edges, said struts being held in alignment with the half bearings embracing the cooperating journal upon the locking of the free edge of at least one of said doors to the fuselage and being free to swing about their pivots only when the free edges of both doors are unattached to the fuselage.

5. The combination with an aircraft fuselage having a cockpit, of a sectional hatch comprising a pair of doors above said cockpit, the adjoining edges of said doors being hinged one to the other, a journal projecting from each end of said hatch adjacent the hinged edges of said doors, a lock operable between the free edge of each door and the adjoining portion of the fuselage at the side of the cockpit, and releasable fastening means to attach said journals to the fuselage, each of said fastening means comprising a pair of struts hinged at their outer ends to the fuselage to swing in a plane perpendicular to the journals, and a pair of complementary half bearings formed in the inner ends of said struts and arranged to engage the adjacent journals.

SETH JOHNSON.